United States Patent [19]

Claypoole et al.

[11] 4,264,649
[45] Apr. 28, 1981

[54] METHOD FOR COATING OPTICAL WAVEGUIDE FILAMENTS

[75] Inventors: Stewart A. Claypoole, Painted Post; Arthur J. Wixson, Elmira, both of N.Y.

[73] Assignee: Corning Glass Works, Corning, N.Y.

[21] Appl. No.: 107,024

[22] Filed: Dec. 26, 1979

[51] Int. Cl.³ .......................... G02B 5/14; G02B 1/10; C03C 25/02
[52] U.S. Cl. .................................. 427/163; 427/434.6
[58] Field of Search .............................. 427/163, 434.6

[56] References Cited
U.S. PATENT DOCUMENTS

| | | | |
|---|---|---|---|
| 3,960,530 | 6/1976 | Iyengar | 427/163 X |
| 4,093,414 | 6/1978 | Swiatovy | 425/113 |
| 4,116,654 | 9/1978 | Trehu | 427/163 X |

Primary Examiner—James R. Hoffman
Attorney, Agent, or Firm—William J. Simmons, Jr.

[57] ABSTRACT

A method of coating an optical waveguide filament employing a sizing die having a tapered aperture terminating in a sizing orifice and a guide cone having a tapered outer wall terminating in a tip which is disposed adjacent said tapered aperture. The filament passes through an orifice in the tip of the guide cone and thereafter through the sizing die. The coating material flows into the channel formed between the tapered aperture and the tapered outer wall and contacts the filament in a region that is located between the guide cone tip and the sizing die orifice.

4 Claims, 7 Drawing Figures

METHOD FOR COATING OPTICAL WAVEGUIDE FILAMENTS

BACKGROUND OF THE INVENTION

1. Field of the Invention

This invention relates to a method for applying a concentric coating to a filament and more particularly, to a method for coating a glass optical waveguide filament.

Glass optical waveguide filaments must exhibit high strength in order to withstand the stresses which are encountered in incorporating them into protective sheathing or cable, installing the cable, or in use. While such waveguides are typically quite strong as drawn from a preform or blank, this strength is rapidly degraded by surface defects which are introduced into the waveguide through handling or otherwise.

To preserve the strength of a newly drawn waveguide filament, it is conventional to apply to the waveguide immediately after it is drawn a thin protective coating composed of an organic or inorganic coating material which serves to shield the waveguide during subsequent handling.

2. Description of the Prior Art

Tapered dies have been employed for the application of coatings to filaments of non-brittle materials such as conductive wires. U.S. Pat. No. 4,093,414 issued to E. S. Swiatovy, Jr. teaches an apparatus employing a single extruder die for applying two coatings to a conductive wire which is maintained in a central position within the extrusion die by a tip having a wire passage extending lengthwise therethrough. Since the conductive wire is not adversely affected by contacting surfaces within the coating apparatus prior to the application of the coating, the tip orifice is just large enough to permit the conductive wire to pass therethrough.

In the field of glass optical waveguides it is desirable to coat the glass filament with a plastic in order to preserve filament strength. In accordance with the teachings of U.S. Pat. No. 3,960,530 issued to R. Iyengar a glass filament is coated on the draw to prevent moisture and dust from contaminating the surface thereof between the time that it is drawn and the time that it is coated and to ensure that the filament surface is coated before microcracks which are on the surface thereof begin to enlarge. The coating apparatus of the Iyengar patent comprises a lower die closure having an aperture therein and a nozzle centrally disposed within the aperture for guiding the glass filament. The lower portion of the die aperture and the outer surface of the nozzle form a cylindrical passage through which the coating material flows prior to its application to the filament. Since the filament is approximately the same size as the nozzle aperture, the filament is subjected to abrasion from the nozzle aperture surface.

U.S. Pat. No. 4,116,654 issued to Y. M. Trehu relates to a method and apparatus for coating a silica filament while ensuring that the filament does not contact any solid surface within the coating die prior to coating. The silica filament passes through the tip portion of a filament guide which is recessed between 0.5 and 1 mm within the extrusion orifice. The amount of recess is sufficient to allow for some flow of molten polymer up into the narrow bore of the tip portion. The clearance between the filament and the inside of the narrow bore is made large enough to allow polymer to flow into the bore but is said to be small enough to maintain good concentricity between core and cladding. For reasons which will be explained hereinafter, the upward flow of coating material into the bore of a filament guide may adversely affect the centering of the filament within the coating.

Copending U.S. patent application Ser. No. 46,232 of J. W. Ohls for "Method of Coating Optical Waveguide Filaments and Coating Die" filed June 7, 1979, teaches a method of coating an optical waveguide filament employing a die body having an at least partly tapered central aperture and radial means for introducing coating material to the central aperture. The method includes exposing the optical waveguide filament to the coating material within the tapered aperture of the die body. The method of the Ohls application does not employ any means separate from the sizing die for centering purposes.

SUMMARY OF THE INVENTION

It is an object of the present invention to provide a method of applying coatings having a low concentricity ratio to optical waveguide filaments.

Another object is to provide a coating method capable of applying to optical waveguide filaments coating materials having a wide range of viscosities.

The present invention pertains to a method of coating an optical waveguide filament. A die holder is provided which supports a sizing die and a guide cone in longitudinally spaced relationship. The die has a longitudinally tapered aperture, the small end of which defines a sizing orifice. The guide cone has an outer wall, the tip of which terminates at the large end of the tapered aperture of the die. The guide cone has a longitudinal orifice therethrough terminating at the tip thereof, the region between the tip end of the outer wall and the tapered aperture forming a conical channel. The waveguide filament is passed through the longitudinal orifice and the tapered aperture, and coating material is introduced into the conical channel from the end thereof adjacent to the guide cone so that the coating material flows over the tip of the guide cone toward the sizing orifice and contacts the surface of the filament. The coating delivery pressure is controlled to cause the coating material to contact the filament at a region thereof between the apex of the guide cone and the sizing die orifice.

DETAILED DESCRIPTION OF THE INVENTION

It is to be noted that the drawings are illustrative and symbolic of the present invention and there is no intention to indicate scale or relative proportions of the elements shown therein.

Figure 1:
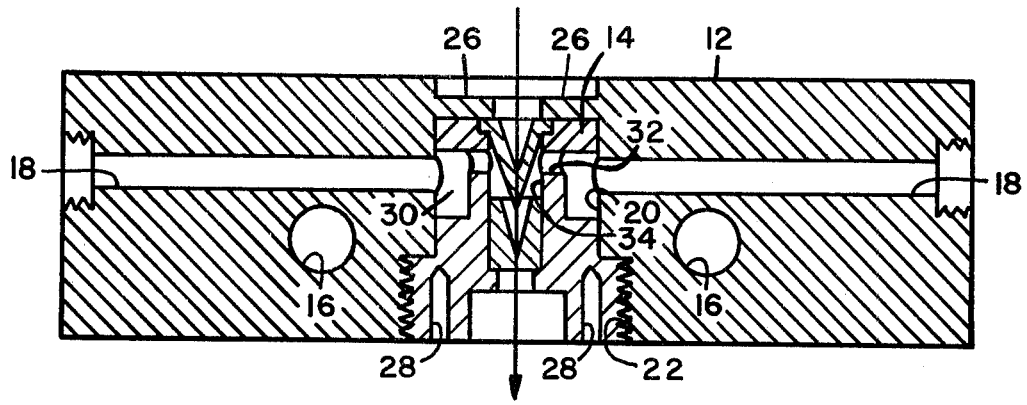
FIG. 1 is a cross-sectional view of an assembly for applying uniform coatings to optical waveguides.

FIG. 1 is a cross-sectional view of a coater assembly including a disc-shaped housing 12 and a die holder insert 14. Two bores 16 conduct temperature controlling liquid through the housing. Two radially disposed inlet ports 18 connect axially disposed bore 20 to the outer periphery of housing 12, at which point ports 18 are enlarged and threaded for receiving coating-conducting lines (not shown). The upper portion of die holder insert 14 fits tightly into bore 20. The enlarged, lower portion of insert 14 is threaded so that it may be received in threaded bore 22. When completely inserted into bore 20, insert 14 contacts inwardly projecting flanges 26. Bores 28 in the lower portion of insert 14 receive a tool which facilitates the insertion of insert 14 into housing 12. An annular slot in insert 14 cooperates with the wall of bore 20 to form annular cavity 30. An axial bore 34 in insert 14 receives a guide cone and a sizing die which are shown in greater detail in FIG. 2. A plurality of radially disposed connecting ports 32 connect cavity 30 to bore 34.

Figure 2:
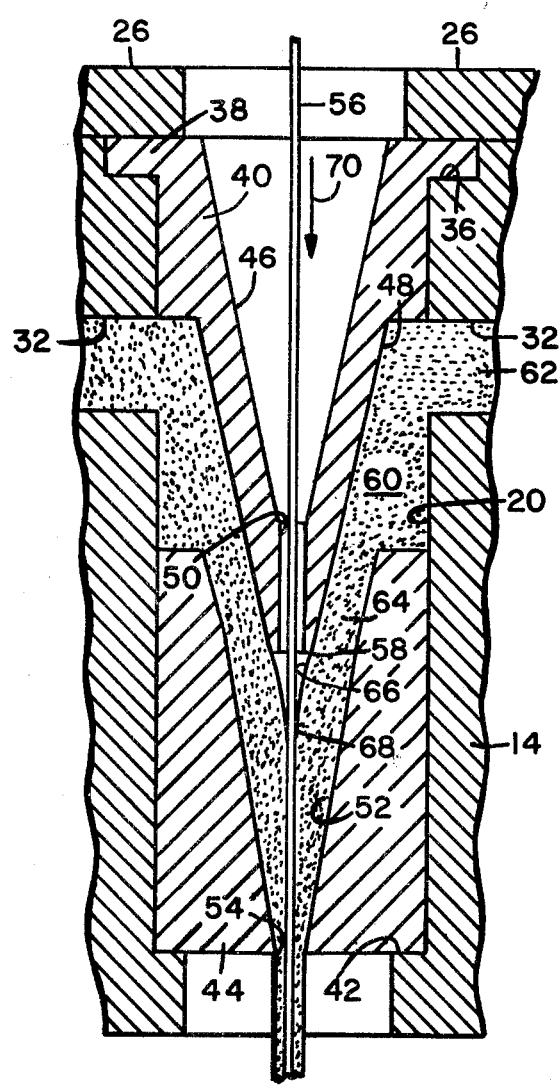
FIG. 2 is a partial cross-sectional view of a die holder insert for use in the assembly of FIG. 1.

Referring to FIG. 2, die holder insert 14 contains a shoulder 36 for receiving a flange 38 projecting from the upper portion of guide cone 40. An inwardly projecting flange at the lower portion of insert 14 provides a seat 42 for supporting sizing die 44. Guide cone 40 is funnel-shaped, having a tapered longitudinal aperture 46 and a tapered outer wall 48 which, along with bore 20, forms annular chamber 60. A cylindrical orifice 50 is located at the bottom of guide cone 40. Die body 44 has a tapered longitudinal aperture 52 which extends to the bottom surface thereof to define a sizing orifice 54. The size of orifice 54 is determined by various parameters including the size of filament 56 which is to be coated, the thickness of the desired coating and the particular coating material employed. The tip 58 of orifice 50 is preferably disposed within tapered aperture 52, which, along with the adjacent portion of cone 40, forms channel 64. Coatings have also been satisfactorily applied by an embodiment wherein tip 58 of the guide cone lies above the top of the sizing die. It appears that the requirement for satisfactory operation is that the coating material be fed into the coater at such a region along guide cone 40 that it flows over tip 58 toward sizing orifice 54.

The size of orifice 54 can be determined as follows. The apparatus of the present invention has been employed to apply three different types of coating material, viz. silicone, urethane acrylate and lacquer coatings. For each type of material there has been a linear relationship between coating thickness and sizing orifice diameter, other process parameters such as fiber diameter and draw rate remaining constant. After having selected a particular coating material, one can coat a particular size of filament with two dies of different orifice sizes and plot the resultant linear relationship between coating thickness and orifice size. Thereafter, the required die orifice size for any desired coating thickness can be obtained from the linear plot.

The purpose of guide cone 40 is to provide a surface over which coating material 62 can uniformly flow prior to contacting filament 56 as it emerges from orifice 50. Guide cone 40 may extend into aperture 52 a distance sufficient to cause coating material 62 to fill channel 64 and flow from tip 58 toward orifice 54. However, it should not extend into aperture 52 to such an extent that an insufficient amount of material 62 can flow through channel 64 to provide a smooth, uninterrupted coating on filament 56. When these conditions exist, the coating depression 66 caused by the moving filament is centered in aperture 52, thereby centering the filament in the coating material. A sinle guide cone has been satisfactorily employed to apply coating materials having viscosities in the range of 10 to 500 poise in thicknesses between 3 and 300 $\mu$m to 125 $\mu$m diameter filaments.

Orifice 50 should be large enough to prevent abrasion of filament 56 during the coating operation. Thus, the primary factors to be considered in determining the diameter of orifice 50 are the length thereof, the diameter of the filament and the maximum amount of tilt to which the coating apparatus is expected to be subjected. An orifice diameter of 0.635 mm has been found to be satisfactory for coating 125 $\mu$m diameter filaments wherein the length of orifice 50 has been up to about 3.8 mm.

Figure 3:
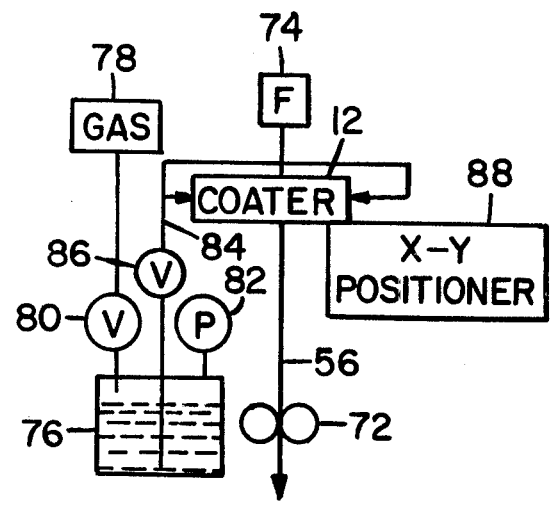
FIG. 3 is a schematic diagram of a system for coating optical waveguide filaments in accordance with the method of the present invention.

A system for employing the present coater for applying a layer of coating material to an optical waveguide filament is illustrated in FIG. 3. Filament 56 is pulled by tractors 72 from furnace 74. Coater housing 12 is mounted between furnace 74 and tractors 72 so that a drawn filament would normally pass through orifices 50 and 54. As is well known in the art, means (not shown) may be employed between the coater housing 12 and the tractors 72 for subjecting the coated filament to heat or ultraviolet light for the purpose of curing the coating material. Coating material is stored in pressurized container 76. A regulated gas source 78 is connected to container 76 by way of pressure regulator 80 which is utilized to control the pressure within container 76. A gas which has no adverse effect on the coating material should be employed, e.g. air, inert gas or the like. The gas pressure in container 76 is displayed by gauge 82. A line 94 in which valve 86 is disposed connects container 76 to inlet ports 18 of the coater. The coating delivery tubes, valve 86, reservoir 76 and coater components such as guide cone 40, sizing die 44 and insert 14 must be formed of materials such as metal, plastic or the like that do not adversely affect the particular coating material that is being applied.

If a vertical filament draw is employed, coater 12 is initially leveled so that the axis of orifice 50 is substantially parallel to filament 56. With valve 86 closed, filament 56 is threaded through orifices 50 and 54 and is engaged by tractors 72. The coater is moved by X-Y positioner 88 until the drawn filament is positioned substantially at the center of orifice 54. Valve 86 is opened and regulator 80 is adjusted to cause coating material to be delivered under pressure through inlet ports 18 to cavity 30. It then flows into chamber 60 by way of connecting ports 32. As the coating material flows through conical channel 64, it separates from tip 58, thereby forming a conically shaped surface or depression 66 which terminates in region 68 where the coating material contacts filament 56 as it is drawn in the direction of arrow 70. It has been found that a low value of coating concentricity ratio (CCR), which is defined as the maximum coating thickness divided by the minimum coating thickness at a given cross-section, can be achieved only when region 68 forms somewhere between tip 58 and orifice 54.

Figures 2A, 2B:
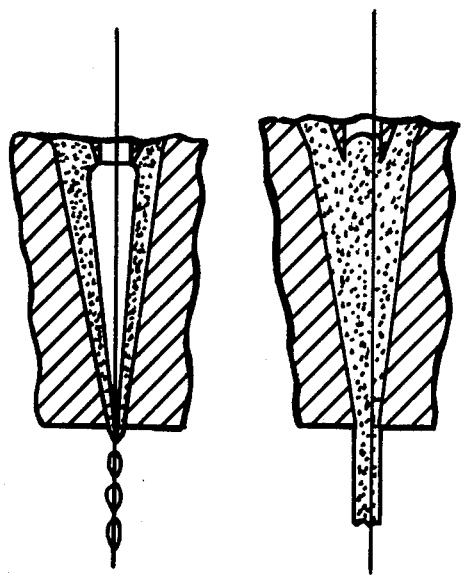
FIGS. 2a and 2b illustrate two flow conditions which result in poor coatings.

The pressure with which the coating material 62 is delivered is initially adjusted to a value lower than the operating pressure so that region 68 of contact of the coating material with the filament fails to fall within tapered aperture 52. This is referred to as the starvation condition and is manifested by coating interruptions and beading of the coating as shown in FIG. 2a. The pressure is then increased until a uniform, continuous coating is observed. This is referred to as the minimum stable pressure. If all operating conditions remained unchanged, the pressure could remain at the minimum stable level. However, the minimum stable pressure for a given guide cone, sizing die, fiber diameter, and coating viscosity, will change directly with the fiber draw rate. To insure that the coating application does not become intermittent if the draw rate should increase, the feed pressure should be increased beyond the minimum stable pressure by some factor. For the entire range of coating thicknesses attempted, i.e., for coating thicknesses ranging from 3 μm to 300 μm, the operating pressure was found to be between about 1.0 and 1.4 times the minimum stable pressure. The preferred operating pressure range was found to be between about 1.15 and 1.3 times the minimum stable pressure. In the pressure range between 1.0 and 1.4 times the minimum stable pressure, region 66 exists between tip 58 and orifice 54 as shown in FIG. 2. Within this range of pressures, a condition of stability exists wherein CCR approaches 1.0. Values of CCR around 1.1 and below are routinely achieved. If the pressure is increased to more than about 1.4 times the starvation pressure, CCR begins to increase as region 68 approaches tip 58. When region 66 reaches tip 58 and coating material begins to flow into orifice 50, as shown in FIG. 2b, a condition of instability exists as the flow of coating material becomes turbulent at the point of contact with filament 56. This turbulent condition causes unacceptable values of CCR, i.e., the coatings are no longer substantially concentric with the filament.

Figure 4:
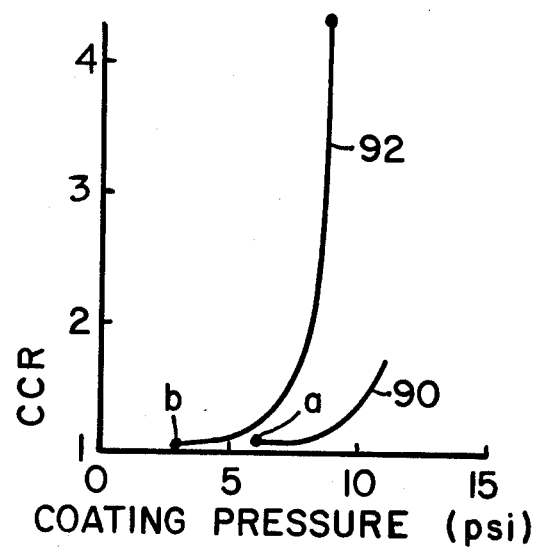
FIG. 4 is a graph wherein coating concentricity ratio is plotted as a function of coating material pressure for two different coating thicknesses.

Plots of coating concentricity as a function of pressure in container 76 are shown in FIG. 4 for two different coating thicknesses. Both of the curves of FIG. 4 were generated during the application of a commercially available silicone coating material referred to as General Electric 670RTV to a glass filament having an outside diameter of about 125 μm. Curve 90 pertains to a 75 μm coating thickness, and curve 92 pertains to a 95 μm coating thickness. The process parameters for the application of these two coatings will be described in greater detail hereinbelow. The points of minimum stable pressure for the runs represented by curves 90 and 92 are shown at a and b respectively.

Figure 6:
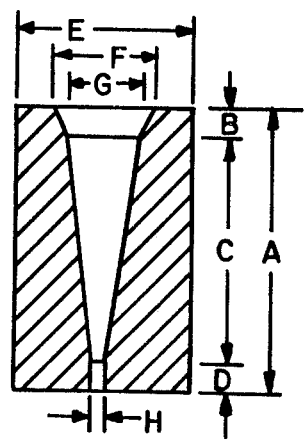
FIGS. 5 and 6 are cross-sectional views of a guide cone and a die body, respectively, which are suitable for use in the coater assembly of the present invention.
Figure 5:
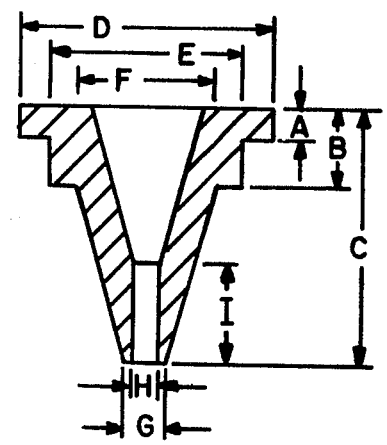

In the following examples a die holder insert 14 was employed wherein the axial distance between shoulder 36 and seat 42 was 1.35 cm. The dimensions of the two different guide cones employed in these examples are set forth in Table 1, reference being made to FIG. 5. The dimensions of the three different sizing dies employed are set forth in Table 2, reference being made to FIG. 6.

TABLE 1

| | Guide Cone Dimensions in mm (see FIG. 5) | | | | | | | | |
|---|---|---|---|---|---|---|---|---|---|
| Type | A | B | C | D | E | F | G | H | I |
| A | 0.71 | 2.41 | 6.27 | 6.30 | 3.76 | 3.76 | 0.97 | 0.69 | 1.65 |
| B | 0.686 | 3.30 | 8.59 | 6.27 | 3.73 | 3.05 | 0.94 | 0.66 | 3.91 |

TABLE 2

| | Sizing Die Dimensions in mm (see FIG. 6) | | | | | | | |
|---|---|---|---|---|---|---|---|---|
| Type | A | B | C | D | E | F | G | H |
| C | 7.34 | 0.86 | 5.97 | 0.48 | 4.45 | 2.84 | 2.01 | 0.32 |
| D | 5.38 | 0.97 | 4.22 | 0.20 | 4.47 | 2.39 | 1.63 | 0.41 |
| E | 7.06 | 0.86 | 5.31 | 0.89 | 4.47 | 2.77 | 1.93 | 0.42 |

In each of the following examples the above-defined apparatus was employed to apply coatings to 125 μm diameter glass optical waveguide filaments.

EXAMPLE 1

A type B guide cone and a type E sizing die were installed in the coater. Container 76 was filled with General Electric 670RTV silicone coating material. The filament was drawn at a rate of 0.5 m/sec. It was threaded through the die cone and sizing die and engaged by tractor 72. A television camera was directed toward orifice 54 so that the position of filament 56 therein could be observed on a monitor. Coater 12, which had been initially leveled, was moved by X-Y positioner 88 until the filament, as viewed on the monitor, appeared to be centrally located within orifice 54. Container 76, delivery tubes 84 and coater 12 were cooled to less than 20° C. to increase the pot life of the silicone coating material. Cool water was circulated through bores 16 in housing 12, and a water jacketed coating delivery tube was employed to cool the delivery tube. The pressure vessel was cooled by placing it in an ice bath. A source 78 of nitrogen was connected to regulator 80. Valve 86 was opened and regulator 80 was manipulated to slowly increase the pressure to permit the coater feed lines and coater to fill and to permit the coater to reach an equilibrium flow condition. A starvation condition existed until the pressure measured at gauge 82 registered about 6 psig at which time the coating material began to smoothly and continuously coat the filament. This minimum stable pressure is represented by point a on curve 90 of FIG. 4. The pressure was then increased to 7 psig and a 74.6 μm thick coating was applied to the filament. The CCR of the coating was 1.06.

In order to ascertain the degradation of CCR with an increase of pressure above the operating pressure, the pressure was incrementally increased to 12 pounds, at which point the CCR had degraded to 1.7. The increase in CCR with increased pressure is illustrated by curve 90.

EXAMPLES 2-5

Different combinations of guide cone and sizing die were employed in the following examples wherein the General Electric 670RTV or Dow Corning X3-9592 silicone were employed as the coating material. The X3-9592 material is a very viscous and thixotropic material which has a pot life of several days at room temperature. All of the operating conditions for examples 2-5 are the same as those specified for Example 1 except as indicated in Table 3.

TABLE 3

| Ex. | Cone | Die | Draw Rate (m/s) | Coating Material | Pressure Minimum Stable | (psig) Operating | Coating Thickness (μm) | CCR |
|---|---|---|---|---|---|---|---|---|
| 2* | A | D | 0.5 | X3-9592 | 4 | 5 | 91.5 | 1.09 |
| 3 | B | C | 0.43 | GE670 | 5 | 6 | 55.3 | 1.03 |
| 4 | B | D | 0.3 | GE670 | 3 | 3.5 | 89.9 | 1.19 |
| 5* | B | D | 0.3 | GE670 | 3 | 4 | 95.6 | 1.22 |

*In Examples 2 and 5 a 0.13 cm thick washer-shaped spacer was disposed between seat 42 and die 44 to increase the protrusion of tip 58 into aperture 52.

We claim:

1. A method of coating a filament comprising the steps of providing a die holder which supports a sizing die and a guide cone in longitudinally spaced relationship, said die having a longitudinally tapered aperture, the small end of which defines a sizing orifice, said guide cone having an outer wall, the tip of which terminates at the large end of said tapered aperture, said guide cone having a longitudinal orifice therethrough terminating at said tip, the region between the tip end of said outer wall and said tapered aperture forming a channel, passing said filament through said longitudinal orifice and said tapered aperture, introducing coating material into said channel from the end thereof adjacent said guide cone so that said coating material flows over the tip of said guide cone toward said sizing orifice, and controlling the coating delivery pressure to cause said coating material to contact said filament at a region thereof between said tip and said sizing die orifice.

2. The method of claim 1 wherein the step of controlling the coating delivery pressure comprises initially adjusting said coating delivery pressure to a pressure within the starvation pressure range, increasing the delivery pressure to a lower stable value at which starvation just ceases, and thereafter increasing the delivery pressure to an operating pressure above said lower stable value.

3. A method in accordance with claim 2 wherein said operating pressure is less than 1.4 times said minimum stable pressure.

4. A method in accordance with claim 3 wherein the step of adjusting the delivery pressure to a value above said lower stable value comprises adjusting the delivery pressure to a value in the range of 1.15 to 1.3 times said lower stable value.

* * * * *